United States Patent
Xiao et al.

(10) Patent No.: US 12,116,888 B1
(45) Date of Patent: Oct. 15, 2024

(54) IMPACT SIMULATION DEVICE AND SIMULATION METHOD FOR CHARACTERISTICS OF ROCK CHIP BEDS IN LARGE DISPLACEMENT WELLS

(71) Applicant: SOUTHWEST PETROLEUM UNIVERSITY, Sichuan (CN)

(72) Inventors: Dong Xiao, Chengdu (CN); Hongyu Xiao, Chengdu (CN); Gao Li, Chengdu (CN); Mingjie Liu, Chengdu (CN); Pan Fang, Chengdu (CN); Yachuan Liu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/523,841

(22) Filed: Nov. 29, 2023

(30) Foreign Application Priority Data

May 24, 2023 (CN) .......................... 202310589513.X

(51) Int. Cl.
*E21B 47/12* (2012.01)
*E21B 21/08* (2006.01)

(52) U.S. Cl.
CPC ............ *E21B 47/138* (2020.05); *E21B 21/08* (2013.01); *E21B 2200/20* (2020.05)

(58) Field of Classification Search
CPC . E21B 7/20; E21B 21/10; E21B 21/08; E21B 49/003; E21B 49/00; E21B 7/00; E21B 49/005; E21B 2200/22; E21B 21/01; E21B 2200/20; E21B 47/00
See application file for complete search history.

(56) References Cited

FOREIGN PATENT DOCUMENTS

AU 2009281823 A1 * 3/2011 ............... C09K 8/38

OTHER PUBLICATIONS

English translation for CN 113628525 (Year: 2021).*
English translation for CN 115584941 (Year: 2023).*

* cited by examiner

*Primary Examiner* — Zakiya W Bates
(74) *Attorney, Agent, or Firm* — Porus IP LLC

(57) ABSTRACT

The present disclosure provides an impact simulation device and simulation method for characteristics of a rock chip bed in a large displacement well. The device comprises a wellbore system, a drilling fluid circulation system, a rock chip transportation system, a drill pipe control system, a data acquisition system, and a data processing system. The wellbore system is configured to simulate a horizontal annulus environment for rock chip transportation during drilling. The drilling fluid circulation system is configured to provide drilling fluid to the wellbore system and collect flow data of the drilling fluid. The rock chip transportation system is configured to simulate an output of rock chips in the horizontal annulus environment during drilling and recover the rock chips. The drill pipe control system is configured to implement drilling simulation in the wellbore system. The data acquisition system is configured to collect monitoring data during the drilling simulation and to transmit the monitoring data to the data processing system. The data processing system is configured to determine ECD correction parameters based on the monitoring data.

15 Claims, 8 Drawing Sheets

400

- 410: Adjusting an eccentricity of a drill pipe to a predetermined eccentricity based on an eccentricity adjustment device
- 420: Adjusting an well inclination angle of a simulated wellbore to a predetermined well inclination angle based on a wellbore lifting device
- 430: Inputting a first displacement of drilling fluid to the simulated wellbore through an inlet pipe based on a circulation pump
- 440: Collecting a volume of the drilling fluid input to the simulated wellbore based on a flow meter
- 450: Driving the drill pipe to rotate at a predetermined rotational speed based on an electric motor
- 460: Reading motor power of the electric motor based on a third frequency inverter
- 470: Injecting rock chips into the simulated wellbore at a predetermined displacement speed through the inlet pipe based on a feed control valve
- 480: Collecting monitoring data of a rock chip bed in the simulated wellbore based on at least one camera and at least one ultrasonic probe
- 490: Collecting pressure data of at least one part of the simulated wellbore based on at least one manometer
- 4100: Determining an ECD based on the pressure data
- 4110: Determining a motor torque of the electric motor based on the motor power

FIG. 4

IMPACT SIMULATION DEVICE AND SIMULATION METHOD FOR CHARACTERISTICS OF ROCK CHIP BEDS IN LARGE DISPLACEMENT WELLS

CROSS-REFERENCE TO RELATED APPLICATIONS

This application claims priority of the Chinese Patent Application No. 202310589513.X, filed on May 24, 2023, the entire contents of which are hereby incorporated by reference

TECHNICAL FIELD

The present disclosure relates to the field of drilling technology, and in particular, to an impact simulation device and simulation method for characteristics of a rock chip bed in a large displacement well.

BACKGROUND

A large displacement well is typically defined as a well in which a ratio of a horizontal displacement to a vertical depth is greater than 2.0. Due to a large slope section and long horizontal section of the large displacement well, rock chips are very easy to accumulate into a bed at the bottom of the annulus, leading to accidents such as pump holding and drill jamming, and affecting the safety of drilling construction and drilling time. In an actual drilling process, the characteristics of the rock chip bed may directly affect the data of equivalent cyclic density (ECD) and drill pipe torque: the formation of the rock chip bed may lead to the formation of a certain pressure of drilling fluid around the borehole, which increases the ECD, thereby causing wall instability and causing the wall to cave in or the drill bit to jam, thus affecting the drilling process. The formation of the rock chip bed may lead to a relatively large friction on the drill pipe as the rock chip bed passes through the bottom of the well, which may lead to an increased torque on the drill pipe. This may lead to twisting or fracturing of the drill pipe, thus affecting the drilling process. Therefore, early identification of borehole uncleanliness in the large displacement well is critical and is key to reducing similar downhole accidents.

CN202023242222.4 provides a device for simulating an effect of a rock chip bed on a friction torque of a drill string in a horizontal well section, which is capable of simulating the friction torque of the drill string at different rotational speeds and at different propulsion speeds of the drill string, and simulating the effect of the rock chip bed on the friction torque of the drill string by adjusting the thickness of the rock chip bed.

CN202022189176.X and CN202011052842.3 provide a simulation experiment device and method for discerning an average thickness of a rock chip bed based on a pressure difference, which calculates an average thickness of the rock chip bed in a simulated wellbore in a region corresponding to two adjacent manometers based on a pressure difference between the two adjacent manometers.

CN202022185283.5 provides a simulation experiment device for discerning a thickness of a rock chip bed based on a measured fluid velocity, which measures fluid velocities at different locations in a simulated wellbore, and establishes a relationship between the fluid velocity and the thickness of the rock chip bed.

The techniques described above have the following disadvantages.

The size of the designed experiment device is scaled down according to the actual scale or without reference to the real drilling size, which cannot accurately demonstrate the formation of the rock chip bed, and the process parameters are also limited by the experiment device.

The impact factors are single, only the impact of the rock chip bed on the drill pipe torque or the impact on the annulus pressure is studied.

The axial distribution of the rock chips in the simulated wellbore is not uniform, which is not applicable to study the impact of the thickness of the rock chip bed on the ECD and the friction torque.

Therefore, it is desirable to provide an impact simulation device and simulation method for characteristics of a rock chip bed in a large displacement well, which can better simulate an impact of the characteristics of the rock chip bed in the large displacement well, and reduce a probability of downhole accidents.

SUMMARY

One of the embodiments of the present disclosure provides an impact simulation device for characteristics of a rock chip bed in a large displacement well. The device may comprise a wellbore system, a drilling fluid circulation system, a rock chip transportation system, a drill pipe control system, a data acquisition system, and a data processing system. The wellbore system may be configured to simulate a horizontal annulus environment for transportation of rock chips during drilling. The drilling fluid circulation system may be configured to provide drilling fluid to the wellbore system and collect flow data of the drilling fluid. The rock chip transportation system may be configured to simulate output of rock chips in the horizontal annulus environment during drilling and recover the rock chips. The drill pipe control system may be configured to implement drilling simulation in the wellbore system. The data acquisition system may be configured to collect monitoring data during the drilling simulation and transmit the monitoring data to the data processing system. The data processing system may be configured to determine ECD correction parameters based on the monitoring data.

One of the embodiments of the present disclosure provides an impact simulation method for characteristics of a rock chip bed in a large displacement well. The impact simulation method for the characteristics of the rock chip bed in the large displacement well may comprise: determining a plurality of sets of working condition data, for one set of working condition data of the plurality of sets of working condition data: the set of working condition data including at least one of a first displacement, a predetermined displacement speed, a predetermined rotational speed, a predetermined eccentricity, and a predetermined well inclination angle; obtaining monitoring data of drilling simulation and motor power of an electric motor corresponding to the set of working condition data; determining an equivalent cyclic density (ECD) based on the monitoring data; determining a motor torque of the electric motor based on the motor power; obtaining a plurality of ECDs and a plurality of motor torques corresponding to the plurality of sets of working condition data; and determining ECD correction parameters based on the plurality of ECDs and the plurality of motor torques.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein:

FIG. 4 is a flowchart illustrating an exemplary process for determining monitoring data and motor power corresponding to a set of working condition data according to some embodiments of the present disclosure;

DETAILED DESCRIPTION

Figure 1:
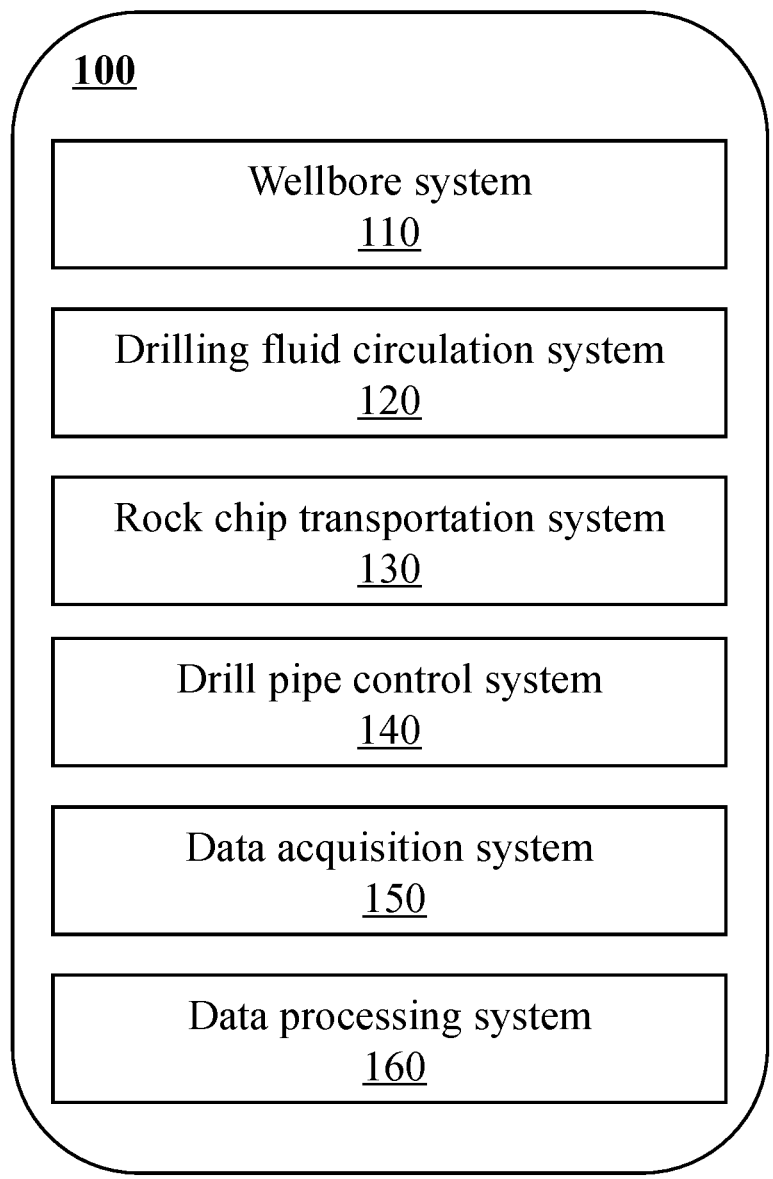
FIG. 1 is a schematic diagram illustrating a system of an impact simulation device for characteristics of a rock chip bed in a large displacement well according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", "an" and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is a schematic diagram illustrating a system of an impact simulation device for characteristics of a rock chip bed in a large displacement well according to some embodiments of the present disclosure.

As shown in FIG. 1, an impact simulation device 100 for characteristics of a rock chip bed in a large displacement well may comprise a wellbore system 110, a drilling fluid circulation system 120, a rock chip transportation system 130, a drill pipe control system 140, a data acquisition system 150, and a data processing system 160.

Figure 2:
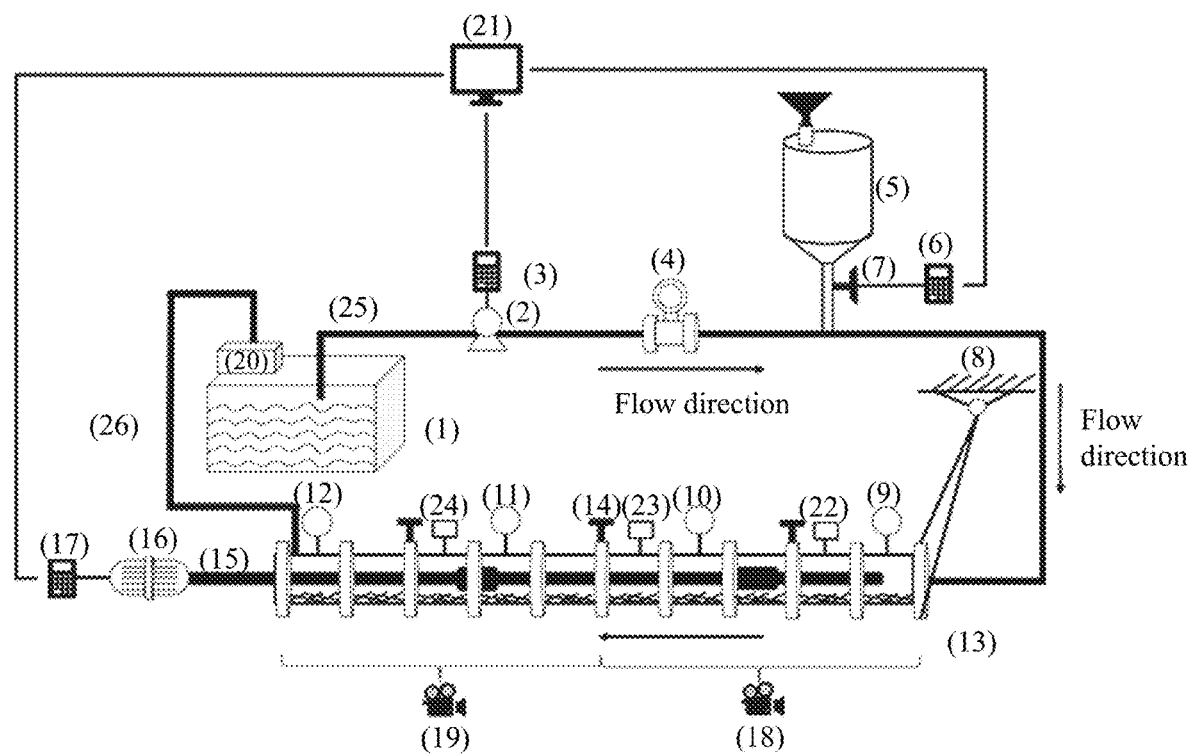
FIG. 2 is a schematic diagram illustrating a structure of an impact simulation device for characteristics of a rock chip bed in a large displacement well according to some embodiments of the present disclosure.

FIG. 2 is a schematic diagram illustrating a structure of an impact simulation device for characteristics of a rock chip bed in a large displacement well according to some embodiments of the present disclosure.

The wellbore system 110 may be configured to simulate a horizontal annulus environment for rock chip transportation during drilling. In some embodiments, as shown in FIG. 2, the wellbore system 110 may include a wellbore lifting device 8 and a simulated wellbore 13. The simulated wellbore 13 may be configured to establish the horizontal annulus environment for the rock chip transportation during drilling.

In some embodiments, the wellbore lifting device 8 may be configured to adjust a well inclination angle of the simulated wellbore 13.

For example, the wellbore lifting device 8 may be implemented based on a device such as a hydraulic rod, to adjust the well inclination angle of the simulated wellbore 13 by adjusting a lifting height of a section of the simulated wellbore 13.

In some embodiments, the wellbore system 110 may also be referred to as a visual wellbore system. At least part of a wall of the simulated wellbore 13 may be made of transparent material. A roughness of the at least part of the wall of the simulated wellbore 13 may satisfy a predetermined roughness condition.

In some embodiments, in order to establish the horizontal annulus environment for the rock chip transportation during drilling, the wellbore system 110 may construct a lower part of the simulated wellbore using cement pouring and an upper part of the simulated wellbore using transparent Plexiglass. The lower part and the upper part of the simulated wellbore may be co-sealed to form the simulated wellbore. By using the transparent plexiglass, or the like, to make the simulated wellbore, it is possible to easily observe the rock chip transportation, and by making the lower part of the simulated wellbore with rough cement, it is possible to simulate a real rough annulus environment of the wellbore.

The drilling fluid circulation system 120 may be configured to provide drilling fluid to the wellbore system and collect flow data of the drilling fluid.

The drilling fluid is a generic term for a variety of circulating fluids that are used in a drilling process to fulfill the needs of the drilling operation in various functions. The drilling fluid may also be referred to as a borehole flushing fluid. In some embodiments, a composition of the drilling fluid may include water, mud, a clay-free phase flushing fluid, an emulsion, foam, compressed air, etc.

The flow data of the drilling fluid is flow data of the drilling fluid flowing into the wellbore system 110 after a drilling fluid circulation pump is turned on.

In some embodiments, as shown in FIG. 2, the drilling fluid circulation system 120 may include a water pool 1, a circulation pump 2, a first frequency converter 3, and a flow meter 4.

In some embodiments, the water pool 1 is configured to store the drilling fluid, and the water pool 1 may be connected with two ends of the simulated wellbore 13 through an inlet pipe 25 and an outlet pipe 26, respectively. The inlet pipe 25 may be provided with the circulation pump 2 and the flow meter 4 in turn. The first frequency converter 3 may be provided on the circulation pump 2, and the flow meter 4 and the first frequency converter 3 may be in communication-connection with the data processing system 160.

In some embodiments, the circulation pump 2 may be configured to inject the drilling fluid from the pool into the horizontal annulus environment of the simulated wellbore 13. The first frequency converter 3 may be configured to regulate a displacement of the circulation pump, and the flow meter 4 may be configured to record the flow rate of the drilling fluid.

In some embodiments, in order to provide the drilling fluid to the wellbore system and collect the flow data of the drilling fluid, the drilling fluid circulation system 120 may simulate the circulating drilling fluid in the horizontal annulus of a horizontal well and record the flow rate of the drilling fluid through the drilling fluid flow meter, thereby establishing the environment of the rock chip transportation in which the drilling fluid is circulating in the horizontal annulus during drilling, and adjusting and recording drilling fluid parameters.

The rock chip transportation system 130 may be configured to simulate output of rock chips in the horizontal annulus environment during drilling and recover the rock chips.

In some embodiments, as shown in FIG. 2, the rock chip transportation system 130 may include a rock chip tank 5, a second frequency converter 6, a feed control valve 7, and a rock chip screen 20.

The rock chip screen 20 may be installed on the outlet pipe for separating the rock chips discharged from the annulus from the drilling fluid individually for recycling. The rock chip tank 5 may be configured to store the rock chips. The rock chip tank 5 may be disposed on the inlet pipe, and the rock chip tank 5 may be provided with the feed control valve 7. The second frequency converter 6 may be provided on the feed control valve 7, and the second frequency converter 6 may be in communication-connection with the data processing system 160.

In some embodiments, the rock chip transportation system 130 may also be referred to as a rock chip feeding and recovery system. The rock chip transportation system 130 may simulate the output of the rock chips in the annulus during drilling and separate the rock chips discharged from the annulus from the drilling fluid individually for recycling. In some embodiments, the second frequency converter 6 may be configured to control an injection rate of the rock chips. The feed control valve 7 may be configured to disconnect and connect communication between the rock chip tank and the simulated wellbore for feeding and stopping feeding the rock chips.

The drill pipe control system 140 may be configured to implement drilling simulation in the wellbore system. In some embodiments, as shown in FIG. 2, the drill pipe control system may include an eccentricity adjustment device 14, a drill pipe 15, an electric motor 16, and a third frequency converter 17.

In some embodiments, the drill pipe control system 140 may also be referred to as a drill pipe rotation and eccentricity control system. The drill pipe 15 and the eccentricity adjustment device 14 may be installed in simulated wellbore, and the drill pipe 15 may be connected with the electric motor 16. The third frequency converter 17 may be installed on the electric motor 16. The eccentricity adjustment device 14 may be configured to adjust an eccentricity of the drill pipe 15. The third frequency converter 17 may be in communication-connection with the data processing system 160.

In some embodiments, in order to implement the drilling simulation in the wellbore system, the drill pipe 15 of the drill pipe control system 140 may use a drill pipe used in real drilling, and include a drill pipe connection segment. The drill pipe control system 140 may control the eccentricity and rotation of the drill pipe by adjusting the electric motor 16 and the eccentricity adjustment device 14, and record parameters such as a rotational speed and the eccentricity of the drill pipe. In some embodiments, the eccentricity adjustment device 14 may include components such as an eccentric flange and a centering device.

The data acquisition system 150 may be configured to collect monitoring data during the drilling simulation and transmit the monitoring data to the data processing system 160. The data acquisition system 150 and the data processing system 160 may also be collectively referred to as a data measurement and processing system. The data acquisition system 150 may realize adjustment control and collection of experimental parameters, and may be connected with the data processing system 160 to constitute a data control and acquisition system, so as to make the whole device more intelligently controlled, and facilitate the operation control and data acquisition and recording.

In some embodiments, the monitoring data may include pressure data of at least one part of the simulated wellbore, and monitoring data of a rock chip bed in the simulated wellbore.

In some embodiments, the data acquisition system may include at least one manometer, at least one camera, and at least one ultrasonic probe. The at least one manometer may be configured to collect the pressure data of the at least one part of the simulated wellbore. The at least one camera and the at least one ultrasonic probe may be configured to collect the monitoring data of the rock chip bed in the simulated wellbore.

The monitoring data of the rock chip bed is monitoring data related to the rock chip bed such as data of a morphology, a trajectory, a thickness, and a length of the rock chip bed, and time to complete removal of the rock chip bed.

As shown in FIG. 2, the data acquisition system may include a first manometer 9, a second manometer 10, a third manometer 11, a fourth manometer 12, a first high-speed camera 18, a second high-speed camera 19, a first ultrasonic probe 22, a second ultrasonic probe 23, and a third ultrasonic probe 24.

The first manometer 9, the second manometer 10, the third manometer 11, and the fourth manometer 12 may be configured to measure pressures at various locations of the simulated wellbore to provide data support for the subsequent calculation of ECD correction parameters. The first high-speed camera 18 and the second high-speed camera 19 may be configured to capture and record the morphology, the trajectory, the thickness, and the length of the rock chip bed, and the time to complete removal of the rock chip bed. The first ultrasonic probe 22, the second ultrasonic probe 23, and the third ultrasonic probe 24 may detect the thickness of the rock chip bed generated during the experiment.

The data processing system 160 may be configured to determine the ECD correction parameters based on the monitoring data. As shown in FIG. 2, the data processing system 160 may be implemented by a computer 21. Descriptions regarding determining the ECD correction parameters based on the monitoring data may be found elsewhere in the present disclosure.

More descriptions regarding the wellbore system 110, the drilling fluid circulation system 120, the rock chip transportation system 130, the drill pipe control system 140, the data acquisition system 150, and the data processing system 160 may be found in the related descriptions of FIGS. 3-7.

In some embodiments, the impact simulation device for the characteristics of the rock chip bed in the large displacement well may further include a slide rail unit and a slide rail drive unit.

In some embodiments, the slide rail unit may be connected with the simulated wellbore. The at least one manometer may be deployed on the slide rail unit. The slide rail drive unit may be configured to drive the at least one manometer to slide on the slide rail unit.

In some embodiments, the slide rail drive unit may be connected with the data processing system to determine a spacing between the manometers based on the data processing system and drive the slide rail unit to move to a corresponding position.

In some embodiments, the slide rail unit and the slide rail drive unit may make the manometers move on the simulated wellbore, so that the correction parameters may be obtained by fitting of an annulus pressure consumption of each finer-grained sub-spacing of the simulated wellbore, thereby obtaining a wider and richer range of test cases.

In response to a determination that the characteristics of the large displacement well are highly susceptible to the formation of rock chip accumulations during downhole drilling, and the characteristics of the rock chip bed may directly affect the data of the ECD and a drill pipe torque, the impact simulation device for the characteristics of the rock chip bed in the large displacement well in this embodiment is based on a full-size wellbore device, which allows continuous addition of the rock chips and reasonable control of the displacement and the rotational speed of the drill pipe, so as to make it possible that the rock chip bed is not formed or a stable and continuous rock chip bed is formed, thereby studying the impact of the presence or absence of the rock chip bed on the ECD and torque data of the drill pipe in different working conditions to correct the ECD and the torque. In practical application, the ECD and the drill pipe torque inversion of the characteristics of the rock chip bed in the large displacement well can be used as an early warning of the early formation of the rock chip bed, which can help make accurate determination in time.

Since the impact simulation device for the characteristics of the rock chip bed in the large displacement has adjustable eccentricity, rotational speed, and displacement of the drill pipe, the wellbore inclination angle of the wellbore may be adjusted by additionally arranging the wellbore lifting device, and the rock chips may be recovered by additionally arranging a rock chip filtering device. Moreover, the impact simulation device for the characteristics of the rock chip bed in the large displacement well integrates experiments on the impact of the presence or absence of the rock chip bed on the ECD and the torque of the drill pipe under different working conditions, experiments on the thickness of the rock chip bed, and experiments on the removal of the rock chip bed.

Therefore, the impact simulation device for the characteristics of the rock chip bed in the large displacement well may carry out experiments on the thickness of the rock chip bed under different well inclination angles, displacements, rotational speeds of the drill pipe, eccentricities, mechanical drilling speeds, drilling fluids, and rock chip particles, and correct and regress a thickness model of the rock chip bed that is suitable for the horizontal segment. At the same time, the impact simulation device for the characteristics of the rock chip bed in the large displacement well may also carry out experiments for removing the rock chip bed under different working conditions to evaluate the effect of removing the rock chip bed.

It should be noted that the above descriptions of the wellbore system, the drilling fluid circulation system, the rock chip transportation system, the drill pipe control system, the data acquisition system, the data processing system, and the modules thereof are only for the convenience of description, and do not limit the present disclosure to the scope of the cited embodiments. It is understood that for those skilled in the art, after understanding the principle of the system, it may be possible to make any combination of the individual modules or form a sub-system to connect with other modules without departing from this principle. In some embodiments, the wellbore system module, the drilling fluid circulation system module, the rock chip transportation system module, the drill pipe control system module, the data acquisition system module, and the data processing system module disclosed in FIG. 1 may be different modules in a single system, or a single module realizing the functions of two or more of the aforementioned modules. For example, the individual modules may share a storage module, and the individual modules may each have a respective storage module. Any such deformations are within the scope of protection of the present disclosure.

Figure 3:
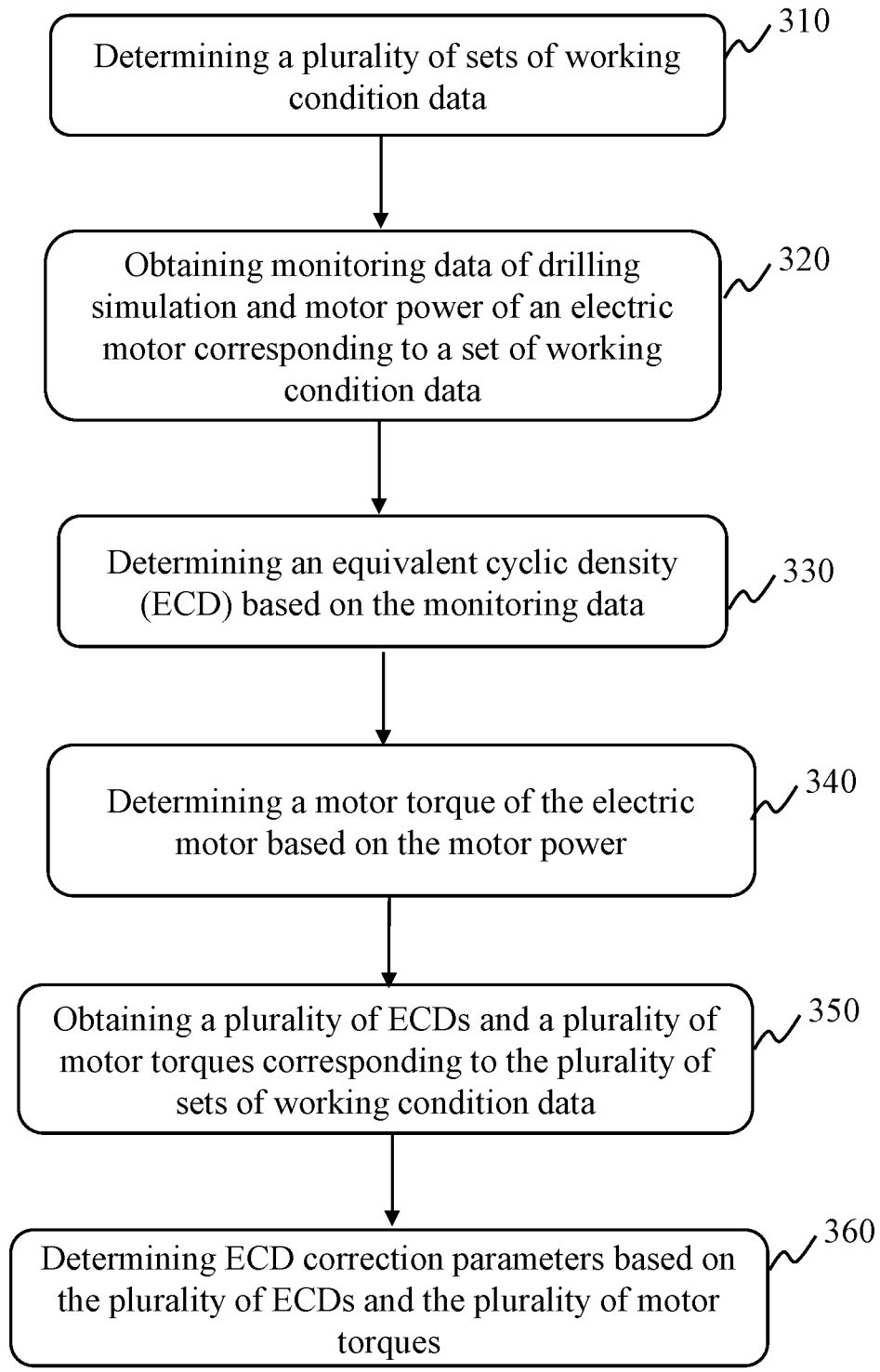
FIG. 3 is a flowchart illustrating an exemplary impact simulation method for characteristics of a rock chip bed in a large displacement well according to some embodiments of the present disclosure.

FIG. 3 is a flowchart illustrating an exemplary impact simulation method for characteristics of a rock chip bed in a large displacement well according to some embodiments of the present disclosure. As shown in FIG. 3, a process 300 may include the following operations. In some embodiments, the process 300 may be performed by the data processing system 160.

In 310, a plurality of sets of working condition data may be determined.

The working condition data refers to work data during drilling. For example, the working condition data may include drilling time, or the like. In some embodiments, a set of working condition data may include at least one of a first displacement, a predetermined displacement speed, a predetermined rotational speed, a predetermined eccentricity, and a predetermined well inclination angle.

The first displacement is a predetermined amount of drilling fluid discharged in drilling simulation. The predetermined displacement speed is a predetermined speed at which rock chips are injected into the simulated wellbore. The predetermined rotational speed is a predetermined rotational speed at which a drill pipe operates. The predetermined eccentricity is a ratio of a preset deviation distance between the drill pipe and a center shaft of the simulated wellbore to a difference between the simulated wellbore and a radius of the drill pipe when the drill pipe operates. The predetermined well inclination angle is a predetermined inclination angle of the simulated wellbore.

In some embodiments, at least one of the first displacement, the predetermined displacement speed, the predetermined rotational speed, the predetermined eccentricity, and the predetermined well inclination angle included in different working condition data may be different.

In some embodiments, the set of working condition data may also include a first displacement, a predetermined displacement speed, and a predetermined rotational speed when a stabile rock chip bed is formed and/or the rock chip bed is not formed in the simulated wellbore. For example, the set of working condition data may include the first displacement, the predetermined displacement speed, the predetermined rotational speed, the predetermined eccentricity, the predetermined well inclination angle, or the like, when the stable rock chip bed is formed in the simulated wellbore, and may also include the first displacement, the predetermined displacement speed, the predetermined rotational speed, the predetermined eccentricity, the predetermined well inclination angle, or the like, when the rock chip bed is not formed in the simulated wellbore.

The working condition data is divided into data when the stable rock chip bed is formed and/or data when the rock chip bed is not formed, thereby facilitating focusing on the two conditions while minimizing interference from other conditions.

The data processing system 160 may obtain the working condition data in various ways. In some embodiments, the data processing system 160 may obtain the plurality of sets of working condition data based on historical drilling simulation data. For example, the data processing system 160 may obtain a plurality of sets of working condition data corresponding to a plurality of historical drillings at a plurality of historical times when a stable rock chip bed was formed. As another example, the data processing system 160 may obtain a plurality of sets of working condition data corresponding to a plurality of historical drillings at a plurality of historical times when the rock chip bed was not formed.

In some embodiments, the working condition data may also be obtained based on an actual demand. For example, the first displacement, the predetermined displacement speed, and the predetermined rotational speed may be determined based on a rock chip critical starting speed.

The rock chip critical starting speed refers to a drill pipe critical rotational speed, a drilling fluid critical displacement, and a rock chip critical generation speed when a stable rock chip bed is formed, or refers to a drill pipe critical rotational speed, a drilling fluid critical displacement, and a rock chip critical generation speed when the stable rock is not formed (e.g., when the rock chip bed is in a transitional state between a stable state and an unstable state). The critical rotational speed may include a maximum value and/or a minimum value of the rotational speed, and the critical displacement may include a maximum value and/or a minimum value of the drilling fluid displacement.

In some embodiments, the rock chip critical starting speed may be determined based on starting speeds at critical points in historical drilling. For example, the data processing system 160 may use an average value of minimal values of the rotational speeds of the drill pipe when the stable rock chip bed is formed in the most recent simulated drillings or historical drillings as a predetermined rotational speed of the rock chip critical starting speed. As another example, the data processing system 160 may use an average value of minimal values of displacements of the drill pipe when the stable rock chip bed is not formed in the most recent simulated drillings or historical drillings as a first displacement of the rock chip critical starting speed. As another example, the data processing system 160 may use an average value of maximum values of displacement speeds of the rock chips when the stable rock chip bed is not form in the most recent simulated drillings as the predetermined displacement speed of the rock chip critical starting speed.

The rock chip critical starting speed when the stable rock chip bed is formed and/or when the stable rock chip bed is not formed is obtained, respectively, so that the impact simulation device for the characteristics of the rock chip bed in the large displacement well may be flexibly controlled to achieve an accurate simulation that the stable rock chip bed is formed or the stable rock chip bed is not formed, which in turn facilitates obtaining the test data in the corresponding state.

In some embodiments, for each of the plurality of sets of working condition data, the data processing system 160 may perform operations such as operations 320-340 below to determine an ECD and a motor torque corresponding to the set of working condition data.

In 320, monitoring data of drilling simulation and motor power of an electric motor corresponding to the set of working condition data may be obtained.

The monitoring data is data that may be monitored during the drilling simulation. For example, the monitoring data may include a pressure data of at least one location in the simulated wellbore, or the like. The monitoring data of the drilling simulation may be collected based on the data acquisition system 150. More descriptions regarding the data acquisition system 150 and the monitoring data may be found in the related descriptions of FIG. 1.

The motor power of the electric motor is working power of the electric motor in the drilling simulation.

In some embodiments, the data processing system 160 may obtain the motor power in real time or at a preset interval. In some embodiments, the data processing system 160 may calculate the motor power by obtaining a reading of the electric motor, or by detecting a current, voltage, inverter frequency, or the like, of a circuit.

More descriptions regarding obtaining the monitoring data and the motor power corresponding to the set of working condition data may be found in the corresponding descriptions of FIG. 4.

In 330, an ECD may be determined based on the monitoring data.

In some embodiments, the data processing system 160 may determine the ECD based on the monitoring data by any feasible calculation. For example, the data processing system 160 may determine the ECD by querying a first preset table. ECDs corresponding to various historical monitoring data may be stored in the first preset table. The data processing system 160 may use an ECD corresponding to historical monitoring data that is the same or closest to current monitoring data as the ECD corresponding to the current monitoring data.

Figure 8:
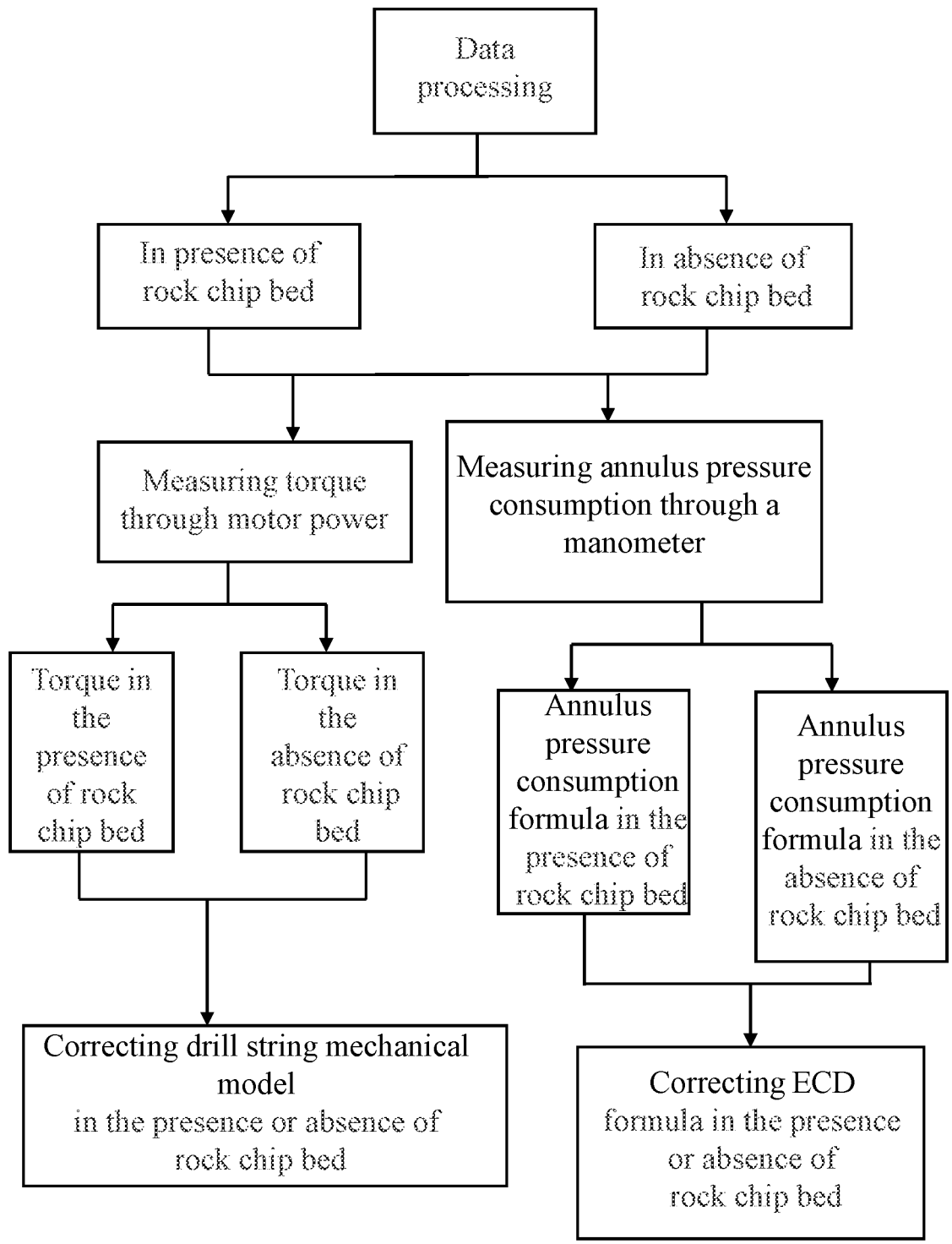
FIG. 8 is a flowchart illustrating data processing according to some embodiments of the present disclosure.

In some embodiments, the data processing system 160 may obtain the ECD by using a formula (3) of FIG. 8. More descriptions regarding calculating the ECD using the formula (3) may be found in the related descriptions of FIG. 8.

In 340, a motor torque of an electric motor may be determined based on the motor power.

In some embodiments, the data processing system 160 may determine the motor torque of the electric motor based on the motor power by any feasible calculation. For example, the data processing system 160 may determine the motor torque of the electric motor by querying a second preset table. Motor torques corresponding to different historical motor powers may be stored in the second preset table. The data processing system 160 may use a motor torque corresponding to historical motor power that is the same or closest to current motor power as the motor torque corresponding to the current motor power.

In some embodiments, the data processing system 160 may calculate the motor torque based on the motor speed and the motor power by using a formula (4) of FIG. 8.

In 350, a plurality of ECDs and a plurality of motor torques corresponding to the plurality of sets of working condition data may be obtained.

With the operations 320-340 described above, the ECD and the motor torque corresponding to each set of working condition data may be determined. By repeating the above operations for each of the plurality of sets of working condition data, the plurality of ECDs and the plurality of motor torques corresponding to the plurality of sets of working condition data may be determined.

In 360, ECD correction parameters may be determined based on the plurality of ECDs and the plurality of motor torques.

The ECD correction parameters are parameters used in an ECD calculation formula to correct the accuracy of results. The ECD correction parameters may be expressed as specific values.

In some embodiments, the ECD correction parameters (which may also be simplified as correction parameters) may be expressed as a coefficient k in a formula (1) of FIG. 8. More descriptions may be found in FIG. 8.

In some embodiments, the data processing system 160 may obtain the ECD correction parameters by using an ECD calculation formula based on the plurality of ECDs and the plurality of motor torques. More descriptions may be found in FIG. 8.

In some embodiments of the present disclosure, by obtaining a large amount of working condition data and processing the monitoring data of the drilling simulation and the motor power of the electric motor corresponding to each set of working condition data, and by considering rock chip accumulations at different well inclination angles, displacements, rotations speeds of the drill pipe, and eccentricities, the ECD correction parameters can be more accurate and in line with most cases, thereby facilitating removing the rock chip bed in actual operation.

FIG. 4 is a flowchart illustrating an exemplary process for determining monitoring data and motor power corresponding to a set of working condition data according to some embodiments of the present disclosure. As shown in FIG. 4, a process 400 may include the following operations. In some embodiments, the process 400 may be performed by the data processing system 160.

In 410, an eccentricity of the drill pipe 15 may be adjusted to a predetermined eccentricity based on an eccentricity adjustment device 14.

In some embodiments, the data processing system 160 may send an instruction for adjusting the eccentricity of the drill pipe 15 to the predetermined eccentricity to the eccentricity adjustment device 14 to adjust the eccentricity of the drill pipe 15. The instruction may include a lifting angle or height, or the like, of the eccentricity adjustment device 14. In some embodiments, the data processing system 160 may obtain an adjusted eccentricity fed back by the eccentricity adjustment device 14 to determine that an adjustment operation is complete. The predetermined eccentricity may be determined based on the working condition data.

In 420, a well inclination angle of the simulated wellbore 13 may be adjusted to a predetermined well inclination angle based on the wellbore lifting device 8.

The predetermined well inclination angle may be determined based on the working condition data. In some embodiments, the data processing system 160 may adjust the well inclination angle to the predetermined well inclination angle by lifting an end of the simulated wellbore 13 based on the wellbore lifting device 8. The specific lifting height may be determined based on the predetermined well inclination angle.

In 430, a first displacement of drilling fluid may be input to the simulated wellbore 13 through the inlet pipe 25 based on the circulation pump 2.

The first displacement may be determined based on the working condition data. In some embodiments, the first displacement may be set based on the first frequency converter 3. For example, power of the circulation pump 2 may be set and an operating time of the circulation pump 2 may be controlled by the first frequency converter 3, which in turn enables the input of the first displacement of drilling fluid to the simulated wellbore 13.

In 440, a volume of the drilling fluid input to the simulated wellbore 13 may be collected based on the flow meter 4.

In some embodiments, the data processing system 160 may read the volume of the drilling fluid in real time based on the flow meter 4. In some embodiments, the flow meter 4 may also upload the volume of the drilling fluid to the data processing system 160 at a preset interval (e.g., 30 s). The input of the drilling fluid to the simulated wellbore 13 may be monitored to determine if the first displacement is satisfied based on the volume reading from the flow meter 4.

In 450, the drill pipe may be driven to rotate at a predetermined rotational speed based on the electric motor.

In some embodiments, the predetermined rotational speed may be set by the third frequency converter 17.

In 460, the motor power of the electric motor may be read based on the third frequency inverter.

In 470, rock chips may be injected into the simulated wellbore 13 at the predetermined displacement speed through the inlet pipe 25 based on the feed control valve 7.

In 480, monitoring data of a rock chip bed in the simulated wellbore 13 may be collected based on at least one camera and at least one ultrasonic probe.

The descriptions regarding the monitoring data of the rock chip bed may be found in the related descriptions of FIG. 1.

In 490, pressure data of at least one part of the simulated wellbore may be collected based on at least one manometer.

In 4100, an ECD may be determined based on the pressure data.

In some embodiments, the data processing system 160 may determine the ECD in various ways. For example, the data processing system 160 may construct a table of predetermined relationships between historical pressure data and historical ECDs corresponding to the historical pressure data in different historical drillings, and then look up the table to determine a historical ECD corresponding to historical pressure data that is the same or similar to current pressure data as a current ECD. The historical pressure data and the historical ECDs corresponding to the historical pressure data may be obtained based on actual measurements.

In some embodiments, the specific manner in which the ECD is determined based on the pressure data may be found in the related descriptions of FIG. 8.

In 4110, a motor torque of an electric motor may be determined based on motor power.

In some embodiments, the specific manner in which the motor torque of the electric motor is determined based on the motor power may be found in the related descriptions of FIG. 8.

In some embodiments of the present disclosure, the monitoring data of the drilling simulation and the motor power of the electric motor corresponding to the working condition data can be obtained by repeating the actual experimental operation for many times, and accurate data in line with the actual situation can be obtained, so that the subsequently obtained ECD correction parameters can more accurately represent the formation and removal of the rock chip bed under different conditions.

In some embodiments, the data processing system 160 may determine a preferred test case based on the ECD correction parameter. The preferred test case refers to a test case that is preferred for use in the drilling simulation. For example, the data processing system 160 may construct a table of predetermined relationships between historical ECD correction parameters for different historical drilling simulation tests and the historical preferred test cases selected for the tests, and by means of looking up the table, select a historical preferred test case corresponding to the historical ECD correction parameters that are the same or similar to the current fitted ECD correction parameters as the current preferred test case. More approaches for determining the preferred test case may be found in the related descriptions of FIG. 6. In some embodiments, the preferred test case may include preferred working condition data and a manometric spacing distribution.

The preferred working condition data means preferred working condition data for use in the drilling simulation. The descriptions regarding the working condition data may be found in the related descriptions of FIG. 3.

In some embodiments, the data processing system 160 may obtain the preferred working condition data in various ways. For example, the data processing system 160 may use working condition data corresponding to historical drillings that satisfy a predetermined effect as the preferred working condition data.

In some embodiments, the at least one manometer may include a plurality of manometers. The manometric spacing distribution refers to spacing data between the plurality of manometers. For example, for a first manometer 9, a second manometer 10, a third manometer 11, and a fourth manometer 12, the manometric spacing distribution may be expressed as (d1, d2, d3), wherein d1 denotes a spacing between the first manometer 9 and the second manometer 10, d2 denotes a spacing between the second manometer 10 and the third manometer 11, and d2 denotes a spacing between the third manometer 11 and the fourth manometer 12. The descriptions regarding obtaining the manometric spacing distribution may be found in the specific descriptions of FIG. 5.

All the manometers may move on the simulated wellbore, so that correction parameters may be obtained by fitting of the annulus pressure consumption of each finer-grained sub-spacing of the simulated wellbore to obtain a wider and richer range of test cases.

In some embodiments of the present disclosure, determining the preferred test case based on the ECD correction parameters takes into full consideration the different drilling scenarios corresponding to different ECD correction parameters, which in turn allows for the inclusion of the preferred test case to continue to fit the ECD correction parameters, so that the final ECD correction parameters can be applied to a wider range of drilling scenarios.

Figure 5:
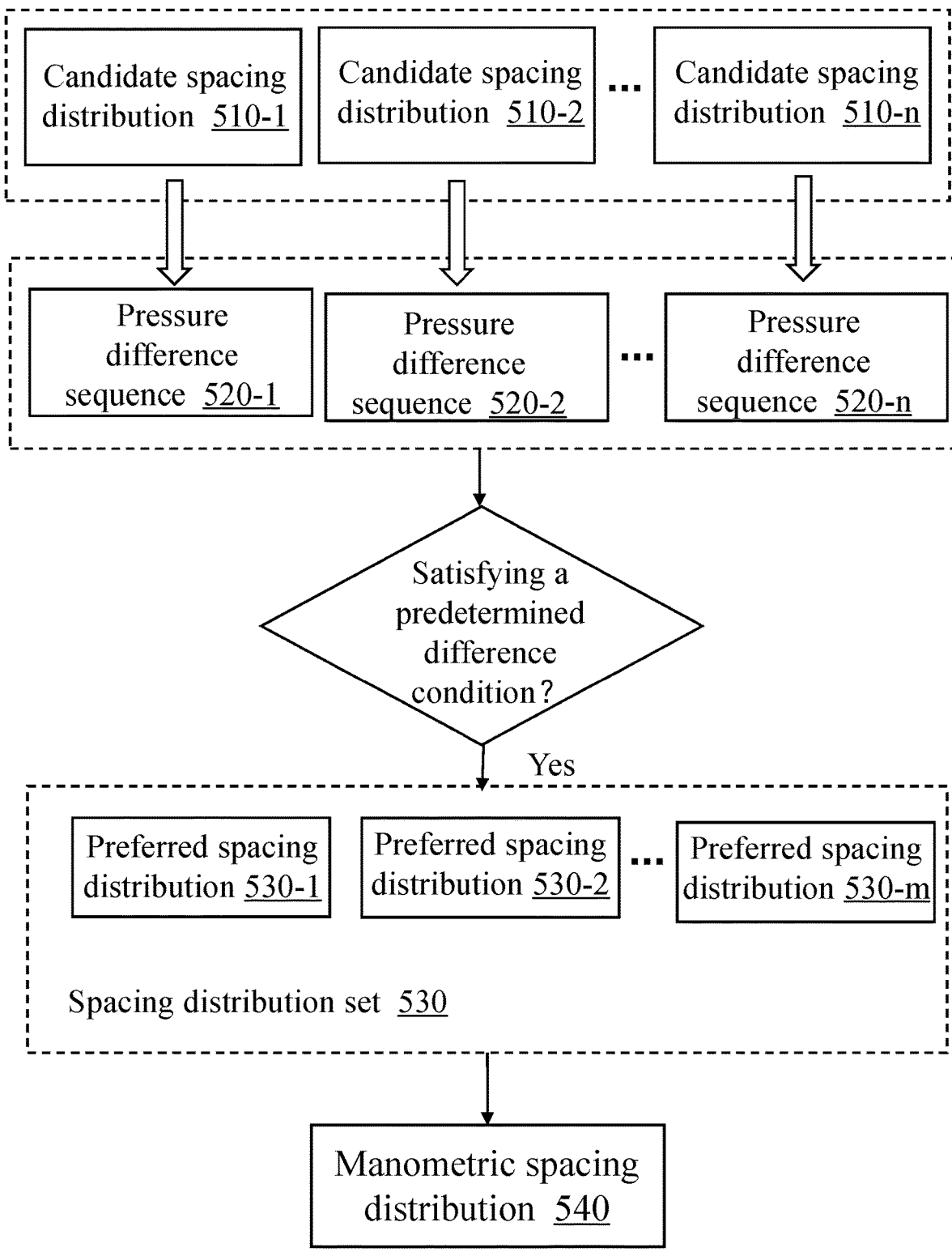
FIG. 5 is a flowchart illustrating an exemplary process for determining a manometric spacing distribution according to some embodiments of the present disclosure.

FIG. 5 is a flow chart illustrating an exemplary process for determining a manometric spacing distribution according to some embodiments of the present disclosure.

The data processing system 160 may obtain the manometric spacing distribution in various ways. In some embodiments, the data processing system 160 may randomly generate a spacing distribution as the manometric spacing distribution.

Figure 6:
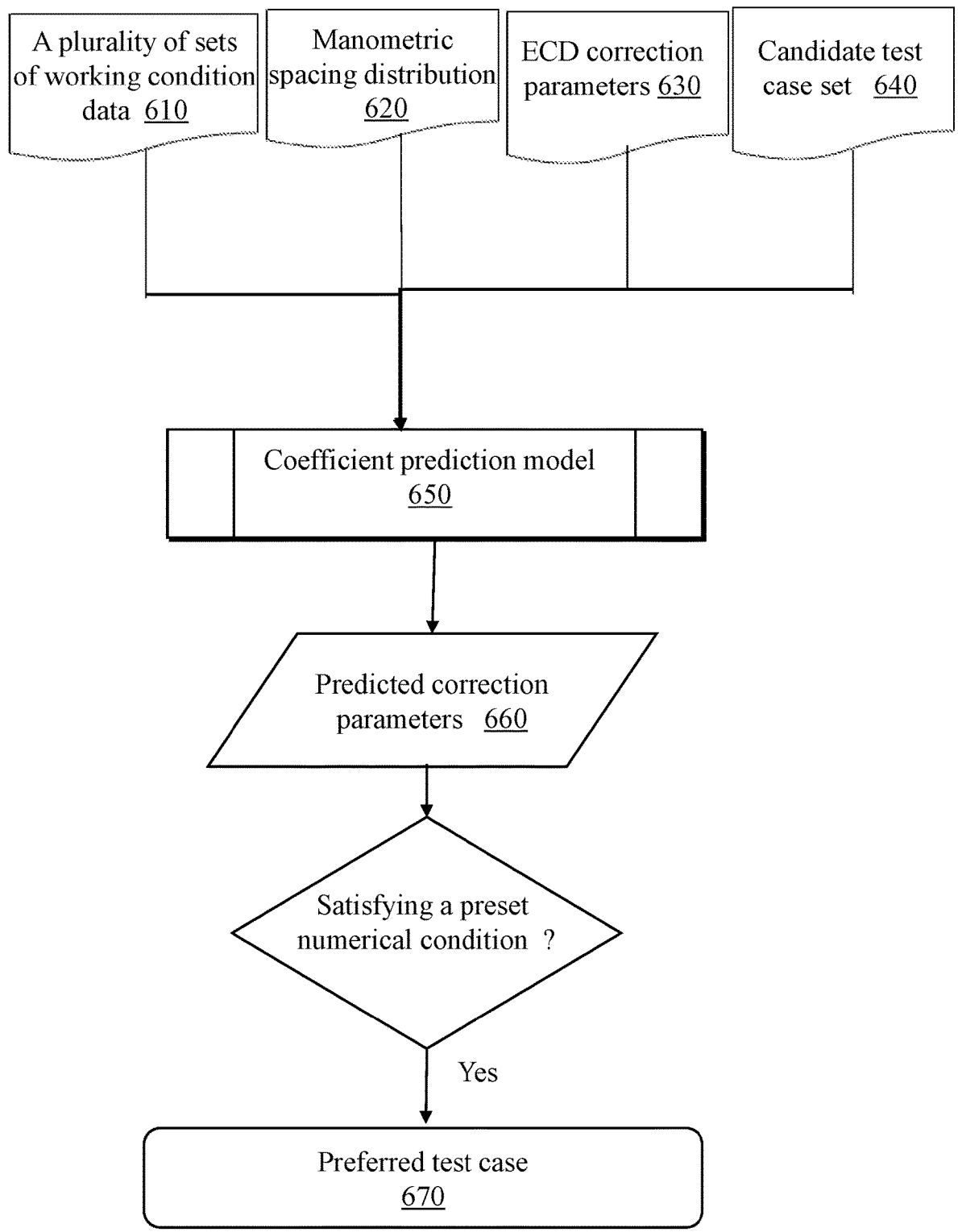
FIG. 6 is a schematic diagram illustrating an exemplary process for determining a preferred test case based on a coefficient prediction model according to some embodiments of the present disclosure.
Figure 7:
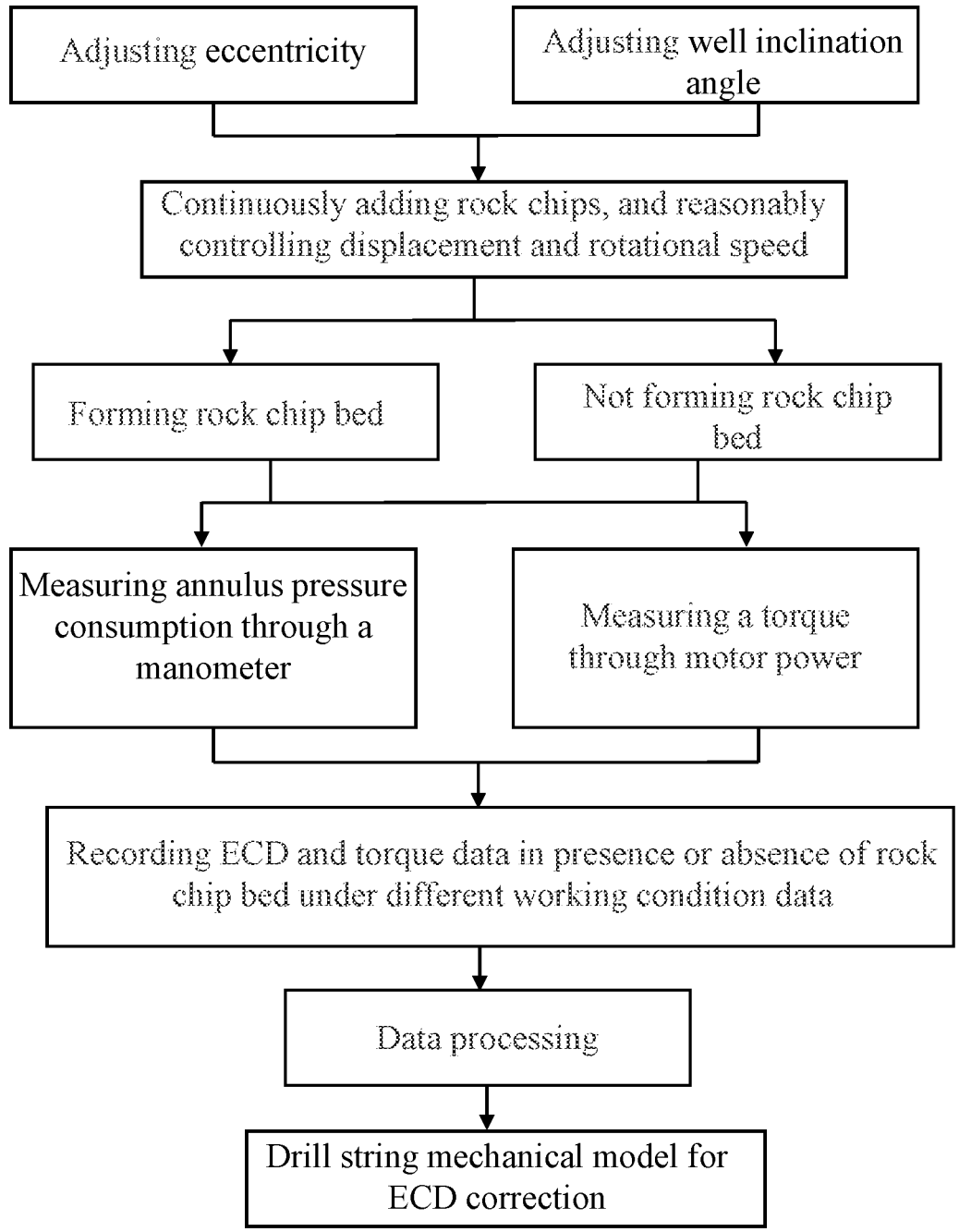
FIG. 7 is a flowchart illustrating an exemplary drilling simulation test according to some embodiments of the present disclosure.

More descriptions regarding determining the preferred test case may be found in the corresponding descriptions of FIG. 6.

In some embodiments, each preferred test case may correspond to a spacing distribution set.

In some embodiments, a manometric spacing distribution 540 may be determined based on a spacing distribution set 530 corresponding to the preferred test case. For example, a spacing distribution may be randomly selected from the spacing distribution set 530 corresponding to the preferred test case as the manometric spacing distribution of the preferred test case.

The spacing distribution set refers to a set including at least one preferred spacing distribution corresponding to the preferred working condition data in the preferred test case. The preferred spacing distribution refers to a preferred manometric spacing distribution corresponding to the preferred working condition data in the preferred test case for performing the drilling simulation. For example, for a certain preferred test case, the spacing distribution set may include a preferred spacing distribution (d1, d2, d3), (d1', d2', d3'), or the like.

In some embodiments, the data processing system 160 may generate a plurality of candidate spacing distributions (e.g., a candidate spacing distributions 510-1, a candidate spacing distribution 510-2, . . . , a candidate spacing distribution 510-n, etc.). For each candidate spacing distribution of the plurality of candidate spacing distributions, the data processing system 160 may determine a pressure difference sequence (e.g., a pressure difference sequence 520-1, a the pressure difference sequence 520-2, . . . , a pressure difference sequence 520-n, etc.) corresponding to each candidate spacing distribution under the preferred working condition data, determine a candidate spacing distribution of which the pressure difference sequence satisfies a predetermined difference condition as the preferred spacing distribution (e.g., a preferred spacing distribution 530-1, a preferred spacing distribution 530-2, . . . , a preferred spacing distribution 530-m), and determine the spacing distribution set 530 corresponding to the preferred test case based on the preferred spacing distribution.

The candidate spacing distributions are spacing distributions used to perform screening to determine the preferred spacing distribution. In some embodiments, the candidate spacing distribution may be obtained in various ways. For example, the candidate spacing distributions may be randomly generated. As another example, a manometric spacing distribution from a historical drilling simulation may be used as the candidate spacing distribution.

The pressure difference sequence is a sequence of pressure reading differences between a plurality of manometers corresponding to the candidate spacing distributions under the preferred working condition data of the preferred test case. For example, the sequence of pressure reading differences may be represented as (r1, r2, r3), wherein r1 represents a pressure reading difference between the first manometer 9 and the second manometer 10, r2 represents a pressure reading difference between the second manometer 10 and the third manometer 11, and r3 represents a pressure reading difference between the third manometer 11 and the fourth manometer 12.

In some embodiments, the data processing system 160 may obtain a manometer reading and calculate to obtain the pressure difference sequence.

The predetermined difference condition refers to a predetermined condition that needs to be satisfied by the pressure difference sequence corresponding to the preferred spacing distribution. In some embodiments, the predetermined difference condition may be that the pressure difference sequence corresponding to the candidate spacing distribution has a similarity greater than a threshold to a standard pressure difference sequence of the spacing distribution set. The threshold may be preset manually.

In some embodiments, an optimal fitting effect is obtained when a certain candidate spacing distribution of the spacing distribution set is used for the drilling simulation, and a pressure difference sequence corresponding to the optimal fitting effect may be used as the standard pressure difference sequence. A good fitting effect means that the ECD correction parameters obtained from the drilling simulation based on the candidate spacing distribution may make a more accurate representation of a wider range of data. For example, the ECD correction parameters may be applied to a wider range of drilling simulation scenarios, and the ECD calculated based on the ECD correction parameters may be more accurate.

In some embodiments, the similarity between the pressure difference sequence corresponding to the candidate spacing distribution and the standard pressure difference sequence of the spacing distribution set may be obtained in various calculations. For example, the pressure difference sequence may be differenced from the corresponding elements in the standard pressure difference sequence separately, and absolute values of differences of all the corresponding elements may be summed. The larger the summation result, the smaller the similarity. As another example, the pressure difference sequence and the standard pressure difference sequence may be represented by vectors, and the similarity may be obtained by calculating a vector distance. The larger the vector distance, the smaller the similarity.

In some embodiments, the data processing system 160 may determine the candidate spacing distributions corresponding to the pressure difference sequences satisfying the predetermined difference condition as the preferred spacing distributions. In some embodiments, the data processing system 160 may also rank the candidate spacing distributions corresponding to the pressure difference sequences satisfying the predetermined difference condition based on a descending order of similarity, and determine top ranked candidate spacing distributions as the preferred spacing distributions.

In some embodiments, after the preferred spacing distributions are determined, the data processing system 160 may determine the preferred distribution set. For example, a set including all the preferred spacing distributions may be used as the preferred distribution set. As another example, at least one of the preferred spacing distributions may be randomly selected to constitute the preferred distribution set.

In some embodiments, the data processing system 160 may randomly select the preferred spacing distributions from the preferred distribution set as the manometric spacing distributions. In some embodiments, the data processing system 160 may also select the preferred spacing distributions corresponding to the pressure difference sequences with the highest similarity from the preferred distribution set as the manometric spacing distributions.

In some embodiments of the present disclosure, the preferred spacing distributions are selected from the candidate spacing distributions to form the preferred distribution set, and the manometric spacing distributions are selected from the preferred distribution set, so that the effect of the drilling simulation can be ensured, and the fitting result can correctly characterize drilling scenarios in various environments.

FIG. 6 is a schematic diagram illustrating an exemplary process for determining a preferred test case based on a coefficient prediction model according to some embodiments of the present disclosure.

In some embodiments, the data processing system 160 may predict, based on a plurality of sets of working condition data 610, a manometric spacing distribution 620 corresponding to each set of working condition data of the plurality of sets of working condition data, ECD correction parameters 630, and a candidate test case set 640, predicted correction parameters 660 corresponding to each candidate test case of the candidate test case set through a coefficient prediction model 650.

The candidate test case set refers to a set of candidate test case sets used to determine the preferred test case. Each candidate test case set may correspond to a set of working condition data and a manometric spacing distribution. In some embodiments, at least one candidate test case may be randomly generated to form the candidate test case set. In some embodiments, the candidate test case set may also be determined based on actual needs.

The predicted correction parameters refer to correction parameters corresponding to the candidate test cases, which may be expressed as specific values.

The descriptions regarding the working condition data and the ECD correction parameters may be found in the related descriptions of FIG. 3.

The coefficient prediction model may be configured to determine the predicted correction parameters corresponding to each candidate test case of the candidate test case set. In some embodiments, the coefficient prediction model may be a machine learning model, such as a Convolutional Neural Network (CNN) model, Neural Network (NN) model, or the like.

An input of the coefficient prediction model may include the plurality of sets of working condition data, the manometric spacing distribution corresponding to each of the plurality of sets of working condition data, the ECD correction parameters, and the candidate test case set, and an output of the coefficient prediction model may include the predicted correction parameters corresponding to each candidate test case of the candidate test case set.

The plurality sets of working condition data input into the coefficient prediction model, and the manometric spacing distribution corresponding to each of the plurality of sets of working condition data may be test cases for which the drilling simulation is carried out, and the ECD correction parameters may be parameters obtained by fitting test data obtained from test cases for which the drilling simulation is performed. In some embodiments, the ECD correction parameters corresponding to the plurality of sets of working condition data may be the same or different. The descriptions regarding fitting may be found in the corresponding descriptions of FIG. 8.

The test cases included in the candidate test case set input to the coefficient prediction model may be a plurality of candidate test cases that have not yet been subjected to the drilling simulation. Each of the plurality of candidate test cases may include the working condition data and the spacing distribution set corresponding to each of the plurality of candidate test cases.

In some embodiments, the coefficient prediction model may be obtained by training based on a large number of first training samples with labels. The first training samples may include a plurality of sets of historical test cases corresponding to a plurality of sets of historical working conditions data, manometric spacing distributions and historical ECD correction parameters corresponding to each of the plurality of sets of historical working conditions data, and historical candidate test case sets. The historical candidate test case sets may include historical test cases other than the plurality of historical test cases. The labels may be historical actual ECD correction parameters corresponding to each test case of the historical candidate test case sets.

For example, 20 drilling simulation tests based on different working condition data and manometric spacing distributions were conducted during a certain historical time period. That is, 20 sets of historical test cases were obtained. The data processing system 160 may use any 5 sets of the historical test cases as historical candidate test case sets of the first training samples, use the historical working condition data corresponding to the other 15 historical test cases, the manometric spacing distributions and the manometric spacing distribution corresponding to each set of historical working condition data, and the historical candidate test case set as the first training samples, use the historical actual ECD correction parameters of the 5 sets of historical test cases as the labels. With the foregoing method, a large amount of training data may be constructed.

It should be noted that the numbers "20", "15", "5", etc., used in the construction of the first training samples may not be fixed. In fact, a large number of training data with different combinations of these numbers need to be constructed.

During model training, the plurality of first training samples with the labels may be input into an initial coefficient prediction model, a loss function may be constructed from the labels and results of the initial coefficient prediction model, and parameters of the initial coefficient prediction model may be iteratively updated based on the loss function. The model training may be completed when the loss function of the initial coefficient prediction model satisfies a predetermined condition, and a trained coefficient prediction model may be obtained. The predetermined condition may be that the loss function converges, a count of iterations reaches a threshold, or the like.

Determining the predicted correction parameters of different test cases based on the coefficient determination model can reduce the amount of manual calculations and improve the efficiency of calculations, and utilizing a large amount of historical data for model training can predict the count of test cases more accurately, making the obtained ECD correction parameters more accurate and reliable.

In some embodiments, the data processing system 160 may determine the candidate test cases corresponding to the predicted correction parameters satisfying a predetermined numerical condition as preferred test cases 670.

The predetermined numerical condition is a condition used to select the preferred test cases. In some embodiments, the preferred test cases may be candidate test cases that a difference between the predicted correction parameters corresponding to the candidate test cases and ECD correction parameters obtained from current fitting (i.e., the ECD correction parameters input into the coefficient prediction model) is greater than a difference threshold. The difference threshold may be preset manually.

In some embodiments, the data processing system 160 may randomly select a count of test cases as the preferred test cases from the candidate test cases satisfying the predetermined numerical condition. In some embodiments, the data processing system 160 may rank the candidate test cases in a descending order of difference based on the foregoing difference, and use the top-ranked candidate test cases as the preferred test cases.

In some embodiments, based on the introduction of a slide rail and the addition of a large number of test cases, the predicted correction coefficients under different test case parameters may be predicted using the coefficient determination model, which allows for a more accurate approximation of a count of test cases that are needed, and then the ECD calculation can be corrected accurately.

In some embodiments, for each candidate test case of the candidate test case set input into the coefficient determination model, the data processing system 160 may also determine the manometric spacing distribution from the spacing distribution set of each candidate test case, and use the manometric spacing distribution as spacing distribution data included in that candidate test case to input into the coefficient determination model. That is, each candidate test case of the candidate test case set input into the coefficient determination model may include the working condition data and the manometric spacing distribution corresponding to each candidate test case of the candidate test case set. Descriptions regarding determining the manometric spacing distribution may be found in the corresponding descriptions of FIG. 5.

In some embodiments of the present disclosure, by selecting test cases corresponding to the manometric spacing distributions with better fitting effect for the test, the ECD correction parameters can be positively optimized in a targeted manner to reduce the impact of poor fitting data. In addition, the preferred test cases are determined based on the predicted correction parameters of the test cases by the coefficient determination model, so that the differences in the ECD correction parameters of different drilling scenarios are fully considered with less calculations, and the ECD correction parameters obtained from the final test can satisfy the treatment of the rock chip bed in more drilling scenarios.

The impact simulation method for the characteristics of the rock chip bed in the large displacement well is further described in detail through the specific operation and calculation formula. It should be noted that a device for continuously adding rock chips in FIG. 7 may be a part of the impact simulation device for the characteristics of the rock chip bed in the large displacement well. In various parts of the present disclosure, the predetermined displacement speed may also be referred to as a rock chip injection rate, the first displacement may be referred to simply as a displacement, and the motor torque may be referred to simply as a torque.

In some embodiments, as shown in FIG. 2, the impact simulation device for the characteristics of the rock chip bed in the large displacement well may comprise the simulated wellbore 13. The wellbore lifting device 8 may be provided at an inlet end of the simulated wellbore 13. The water pool 1 may be connected with the inlet end of the simulated wellbore 13 through a pipeline. The pipeline may be sequentially provided with the circulation pump 2, the flow meter 4, and the rock chip tank 5. The rock chip tank 5 may be provided with the feed control valve 7. The first frequency converter 3 disposed on the circulation pump 2 and the second frequency converter 6 disposed on the feed control valve 7 may be connected with the computer 21.

In some embodiments, another end of the simulated wellbore 13 may be an outlet end connected with the water pool 1 through a pipeline, and provided with the rock chip screen 20. The drill pipe 15 may penetrate deep into the simulated wellbore 13, and the drill pipe 15 may be connected with the electric motor 16. The third frequency converter 17 of the electric motor 16 may be connected with the computer 21.

In some embodiments, the simulated wellbore 13 may be provided with the eccentricity adjustment device 14. The simulated wellbore 13 may be sequentially provided with the first manometer 9, the second manometer 10, the third manometer 11, and the fourth manometer 12, and also sequentially provided with the first ultrasonic probe 22, the second ultrasonic probe 23, and the third ultrasonic probe 24. The simulated wellbore 13 may be externally provided with the first high-speed camera 18 and the second high-speed camera 19.

The impact simulation method for the characteristics of the rock chip bed in the large displacement well may be implemented based on the impact simulation device for the characteristics of the rock chip bed in the large displacement well. The specific flow of the experiment (i.e., the drilling simulation) may be shown in FIG. 7.

The impact simulation device for the characteristics of the rock chip bed in the large displacement well may use the full-size simulated wellbore 13. Transparent Plexiglas may be used for an upper half of the wall of the simulated wellbore 13, and a roughness of the wall of the simulated wellbore 13 may be simulating by pouring cement on a lower half of the wall of the simulated wellbore 13.

In some embodiments, a high-speed camera may be placed every five sections (e.g., five stubs, with the drill pipe including a number of stubs) for capturing and recording a morphology, a trajectory, a thickness, and a length of the rock chip bed, and time to complete removal of the rock chip bed. The first ultrasonic probe 22, the second ultrasonic probe 23, and the third ultrasonic probe 24 may be uniformly disposed outside the simulated wellbore 13 for detecting the thickness of the rock chip bed generated during the experimental process.

S1, first the water pool 1 may be filled with experimental drilling fluid, and the rock chip tank 5 of the device for continuously adding rock chips may be filled with the rock chips.

S2, the eccentricity of the drill pipe 15 may be adjusted to a predetermined eccentricity and a well inclination angle of the simulated wellbore 13 may be adjusted to a predetermined well inclination angle by the eccentricity adjustment device 14 and the wellbore lifting device 8.

More descriptions regarding the predetermined eccentricity and the predetermined well inclination angle may be found in the related descriptions of FIG. 3.

S3, after the drilling fluid circulation pump 2 is turned, the displacement may be set by the first frequency converter 3, and data may be read by the flow meter 4.

More descriptions regarding the displacement may be found in the related descriptions of FIG. 3.

S4, the electric motor 16 may be turned on, the rotational speed of the drill pipe 15 may be set through the third frequency converter 17, and the torque may be indirectly measured by reading the power of the electric motor on the third frequency converter 17.

S5, a rock chip injection speed may be set by the second frequency converter 6, and the feed control valve 7 of the device for continuously adding the rock chips may be opened. At this time, the rock chips may be continuously added to simulate a real drilling process, and a mixture of the rock chips and the drilling fluid may enter the simulated wellbore 13.

S6, the displacement and the rotational speed of the drill pipe may be reasonably controlled, and a minimum displacement with the rock chips and the rotational speed of the drill pipe may be set based on the rock chip critical starting speed, so that a stable rock chips bed may be formed or the rock chip bed may not be formed. The thickness of the rock chip bed may be measured using the first ultrasonic probe 22, the second ultrasonic probe 23, and the third ultrasonic probe 24. The process may be captured and recorded by the first high-speed camera 18 and the second high-speed camera 19.

The minimum displacement with the rock chips is a minimum displacement of drilling fluid carrying the rock chips. When the displacement is less than the minimum displacement with the rock chips, the stable rock chip bed may be formed. When the displacement is greater than the minimum displacement with the rock chips, the rock chip bed may not be formed. More descriptions regarding the rock chip critical starting speed may be found in FIG. 3.

S7, pressure at each location of the simulated wellbore 13 may be measured by the first manometer 9, the second manometer 10, the third manometer 11, and the fourth manometer 12; the ECD may be calculated; and the torque may be measured by the power of the electric motor 16. More descriptions regarding specific calculations may be found in FIG. 8.

S8, the ECD and torque data with presence and absence of the rock chip bed under different working conditions may be recorded, the ECD and torque data with presence and absence of the rock chip bed under different working conditions may be compared, and the first frequency converter 3, the second frequency converter 6, the third frequency converter 17 and the first manometer 9, the second manometer 10, third manometer 11, and fourth manometer 12 may transmit the data to the computer 21 for data processing to correct the ECD (ECD is equivalent cyclic density) and a drilling string mechanical model.

The drill string mechanical model refers to a model used to represent a relationship between the thickness of the rock chip bed and the drill pipe torque. The drill string mechanical model may be applied to a scenario where an effect of drill pipe stiffness is ignored. In some embodiments, the drill string mechanical model may be established based on measuring motor torques corresponding to different thicknesses of rock chip beds. In some embodiments, the motor torque may be obtained by measurement or calculation. For example, the motor torque may be obtained based on a formula (4) of FIG. 8. More descriptions may be found in FIG. 8.

S9, finally the rock chips may be separated in the rock chip screen 20 and recycled to be injected into the rock chip tank 5 again.

S10, a next set of simulation experiment may be performed by changing a different eccentricity, well inclination angle, rotational speed of drill pipe, rock chip injection speed, and displacement.

The data processing flow may be shown in FIG. 8. When the impact of the rock chip bed on the ECD and the drill pipe torque is studied, the displacement and the rotational speed of the drill pipe, and the rock chip injection speed may be reasonably controlled to form the stable rock chip bed. The readings of the manometer and the power of the electric motor may be read, and the data with the rock chip bed may be substituted into the formula under the corresponding conditions to make corrections. Studying the impact of absence of the rock chip bed on the ECD and the drill pipe torque may be similar as set forth above.

The specific ECD calculation process may be illustrated as follows by taking the first manometer 9 and the second manometer 10 as an example.

(1) In the absence of the rock chip bed $$\Delta P_a = kk_1k_2 \frac{32\lambda \Delta L \rho_f Q^2}{\pi^2 (D-d)^3 (D+d)^2} + \rho_s g C_a \cos\theta \quad (1)$$

Wherein $\Delta P_a$ denotes annulus pressure consumption in the absence of the rock chip bed in Pa, which may be obtained based on actual measurements or formula (e.g., formula (1)).

k denotes a dimensionless correction parameter, which may be obtained based on data fitting.

$k_1$ and $k_2$ denote a dimensionless rotation factor and a dimensionless eccentricity factor, respectively, which may be obtained based on formula (e.g., formula (1)).

$\lambda$ denotes a dimensionless friction coefficient, which may be obtained based on the formula (e.g., formula (1)).

$\Delta L$ denotes a spacing between the first manometer 9 and the second manometer 10 in m, which may be measured or preset.

θ denotes a well inclination angle, which may be measured or preset.

g denotes the acceleration of gravity in m/s².

$C_a$ denotes a dimensionless annulus rock chip concentration.

Wherein the annulus rock chip concentration is determined based on formula:

$$C_a = \frac{ROP}{3600(v_a - v_s)\left(1 - \frac{d^2}{D^2}\right)}$$

Wherein ROP (Rate of Penetration) denotes a mechanical drilling speed in m/h. For example, the ROP may be a drilling footage per unit hour of a drill bit in drilling, which may reflect the drilling speed and may be preset. Since the rock chips are generated in the drilling process, the greater the ROP, the greater the amount of rock chips generated per unit time. The ROP may be reflected by controlling a speed of adding rock chips during the simulation. The greater the speed of adding rock chips, the greater the ROP.

$$v_s = \frac{0.071 d_s (\rho_s - \rho_f)^{0.667}}{(\rho_f \times \mu_f)^{0.333}}$$

A rock chip settling speed is determined based on the formula:

Wherein $v_s$ denotes the rock chip settling speed in m/s, which may be calculated based on the formula.

$d_s$ denotes diameters of rock chips in mm, which may be measured.

$\rho_s$ denotes densities of rock chips in g/cm³, which may be measured.

$\rho_f$ denotes a density of drilling fluid in g/cm³, which may be measured.

$\mu_f$ denotes a viscosity of drilling fluid in mPa·s, which may be measured.

An annulus return speed of drilling fluid is determined based on the formula: $v_a = 1273Q/D^2 - d^2$.

$v_a$ denotes the annulus return speed in m/s.

Q denotes a displacement in L/s, which may be measured or preset.

D denotes a borehole diameter in mm, which may be measured or preset.

d denotes an outer diameter of a drill pipe in mm, which may be measured or preset.

(1) In the presence of the rock chip bed $$\Delta P_b = \frac{0.0260686 h \Delta P_a}{\lambda} \left[ \frac{4Q^2 \rho_f}{g\pi^2 (D-d)^3 (D+d)^2 (\rho_s - \rho_f)} \right]^{-1.25} \quad (2)$$

Wherein $\Delta P_b$ denotes annulus pressure consumption in the presence of the rock chip bed in Pa, which may be obtained based on actual measurement or formula.

$\Delta P_a$ denotes annulus pressure consumption in the absence of the rock chip bed in Pa, which may be obtained based on actual measurement or formula.

h denotes a dimensionless thickness of the rock chip bed, which may be measured.

Q denotes a displacement in L/s, which may be measured or preset.

$\rho_s$ denotes a density of rock chips in kg/m³, which may be measured.

$\rho_f$ denotes a density of drilling fluid in kg/m³, which may be measured.

g denotes the acceleration of gravity in m/s².

D denotes a borehole diameter in m, which may be measured or preset.

d denotes an outer diameter of a drill pipe in m, which may be measured or preset.

$\lambda$ denotes a dimensionless friction coefficient, which may be calculated based on Re by formula or obtained by preset.

Wherein Re denotes a Reynolds number, which is a dimensionless number used to characterize the flow of a fluid and is determined based on the formula $$Re = \frac{\rho v d}{\mu}.$$

The fluid may be the drilling fluid. The descriptions regarding the drilling fluid may be found in the previous descriptions.

ρ denotes a density of fluid in kg/m³, which may be measured.

v denotes a flow speed of fluid in m/s, which may be measured by calculating the displacement.

μ denotes a viscosity of fluid in Pa·s, which may be measured.

d denotes an equivalent diameter of the wellbore, i.e., a difference between an inner diameter of the wellbore and an outer diameter of the drill pipe in m, which may be measured; and when Re<2000, $$\lambda = \frac{64}{Re}.$$

When 2000≤Re<4000, $$\lambda = \frac{64 + 0.007735(Re - 2000)}{2000}.$$

When Re≥350000, λ=0.013.

$$\lambda = \frac{0.3164}{R_e^{0.25}}.$$

(3) ECD in the presence or absence of the rock chip bed may be obtained according to formula (1) and formula (2):

$$\rho_{ECD} = \rho_f + \frac{\Delta P}{0.00981 H} \quad (3)$$

Wherein $\rho_{ECD}$ denotes an equivalent circulation density of drilling fluid in kg/m³.

ΔP denotes annulus pressure consumption between the first manometer 9 and the second manometer 10 in Pa, and ΔP=|P$_1$−P$_2$|, wherein P$_1$ and P$_2$ denote readings of the first manometer 9 and the second manometer 10, respectively.

$\rho_f$ denotes a density of drilling fluid, kg/m³, and may be measured.

H denotes a vertical depth at a point of the wellbore in m, which may be measured.

(4) Motor torque is determined based on the formula $$T = 9950 \frac{P}{n} \quad (4)$$

T denotes a torque in N·m; and motor power of a torque sensor may be measured, which is then converted to torque data by the formula (4).

P denotes output power in KW, which may be measured.

n denotes motor speed in r/min, which may be measured or preset.

In some embodiments, the data processing system 160 may determine the correction parameters by data fitting based on the data measured for each test case. In subsequent simulations, the annulus pressure consumption in the absence of the rock chip bed may be determined by applying more accurate correction parameters, thereby improving the calculation accuracy of the ECD.

For example, the data processing system 160 may fit the annulus pressure consumption, the spacing between the first manometer 9 and the second manometer 10, the well inclination angle, the annulus rock chip concentration, the density of the rock chips, the density of the drilling fluid, the displacement, the borehole diameter, the outer diameter of the drill pipe, and the relationship function of the correction parameters in the presence or absence of the rock chip bed based on the annulus pressure consumption, the spacing between the first manometer 9 and the second manometer 10, the well inclination angle, the annulus rock chip concentration, the density of the rock chip, the density of the drilling fluid, the displacement, the borehole diameter, the outer diameter of the drilling rod, and the correction parameters in the presence or absence of the rock chip bed measured based on historical experiments, so that the corresponding correction parameters may be determined based on the corresponding relationship function and the measured annulus pressure consumption, the spacing between the first manometer 9 and the second manometer 10, the well inclination angle, the annulus rock chip concentration, the density of the rock chip, the density of the drilling fluid, the displacement, the borehole diameter, and the outer diameter of the drill pipe. In addition, optimal values of the correction parameters may be obtained based on the plurality of test data and used as the final correction parameters. Accordingly, in the subsequent test, the annulus pressure consumption in the presence or absence of the rock chip bed may be determined by collecting the corresponding monitoring data through the impact simulation device for the characteristics of the rock chip bed in the large displacement well, and then the ECD in the presence or absence of the rock chip bed may be determined. The fitting may include polynomial fitting, etc.

In some embodiments, the data processing system 160 may determine a motor torque formula by data fitting based on the data measured for each test case, which in turn may enable fast and accurate determination of the motor torque based on the measured data in subsequent simulations. The specific fitting process may be similar to that of the correction parameters, and may be found in the descriptions of the fitting of the correction parameters.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An impact simulation device for characteristics of a rock chip bed in a large displacement well, comprising:
  a wellbore system, a drilling fluid circulation system, a rock chip transportation system, a drill pipe control system, a data acquisition system, and a data processing system, wherein
  the wellbore system is configured to simulate a horizontal annulus environment for rock chip transportation during drilling;
  the drilling fluid circulation system is configured to provide drilling fluid to the wellbore system and collect flow data of the drilling fluid;
  the rock chip transportation system is configured to simulate output of rock chips in the horizontal annulus environment during drilling and recover the rock chips;
  the drill pipe control system is configured to implement drilling simulation in the wellbore system;
  the data acquisition system is configured to collect monitoring data during a drilling simulation process and transmit the monitoring data to the data processing system; and
  the data processing system is configured to determine equivalent cyclic density (ECD) correction parameters based on the monitoring data.

2. The device of claim 1, wherein the wellbore system includes a wellbore lifting device and a simulated wellbore, and the wellbore lifting device is configured to adjust a well slope angle of the simulated wellbore.

3. The device of claim 2, wherein at least part of a wall of the simulated wellbore is made of a transparent material, and a roughness of the at least part of the wall of the simulated wellbore satisfies a predetermined roughness condition.

4. The device of claim 2, wherein the drilling fluid circulation system includes a water pool, a circulation pump, a first frequency inverter, and a flow meter, wherein
  the water pool is configured to store the drilling fluid, and the water pool is connected with two ends of the simulated wellbore through an inlet pipe and an outlet pipe, respectively;
  the inlet pipe is sequentially provided with the circulation pump and the flow meter;
  the first frequency converter is provided on the circulation pump; and
  the flow meter and the first frequency converter are in communication-connection with the data processing system.

5. The device of claim 4, wherein the rock chip transportation system includes a rock chip tank, a second frequency converter, a feed control valve, and a rock chip screen, wherein
  the rock chip screen is installed on the outlet pipe;
  the rock chip tank is configured to store the rock chips, the rock chip tank is disposed on the inlet pipe, and the rock chip tank is provided with the feed control valve; and
  the second frequency inverter is provided on the feed control valve, and the second frequency inverter is in communication-connection with the data processing system.

6. The device of claim 5, wherein the drill pipe control system includes an eccentricity adjustment device, a drill pipe, an electric motor, and a third frequency converter, wherein
  the drill pipe and the eccentricity adjustment device are installed in the simulated wellbore, the drill pipe is connected with the electric motor; and the third frequency converter is installed on the electric motor;
  the eccentricity adjustment device is configured to adjust an eccentricity of the drill pipe; and
  the third frequency inverter is in communication-connection with the data processing system.

7. The device of claim 6, wherein the monitoring data includes pressure data of at least one part of the simulated wellbore, and monitoring data of a rock chip bed in the simulated wellbore, wherein
  the data acquisition system includes at least one manometer, at least one camera, and at least one ultrasonic probe;
  the at least one manometer is configured to collect the pressure data of the at least one part of the simulated wellbore; and
  the at least one camera and the at least one ultrasonic probe are configured to collect the monitoring data of the rock chip bed in the simulated wellbore.

8. The device of claim 7, further comprising a slide rail unit and a slide rail drive unit, wherein the slide rail unit is connected with the simulated wellbore, the at least one manometer is deployed on the slide rail unit, and the slide rail drive unit is configured to drive the at least one manometer to slide on the slide rail unit.

9. An impact simulation method for characteristics of a rock chip bed in a large displacement well, implemented on a data processing system of claim 7, comprising:
determining a plurality of sets of working condition data, for one set of working condition data of the plurality of sets of working condition data:
the set of working condition data including at least one of a first displacement, a predetermined displacement speed, a predetermined rotational speed, a predetermined eccentricity, and a predetermined well inclination angle;
obtaining monitoring data of drilling simulation and motor power of an electric motor corresponding to the set of working condition data;
determining an equivalent cyclic density (ECD) based on the monitoring data;
determining a motor torque of the electric motor based on the motor power;
obtaining a plurality of ECDs and a plurality of motor torques corresponding to the plurality of sets of working condition data; and
determining ECD correction parameters based on the plurality of ECDs and the plurality of motor torques.

10. The method of claim 9, wherein the first displacement, the predetermined displacement speed, and the predetermined rotational speed are determined based on a rock chip critical starting speed; and
the set of working condition data includes a first displacement, a predetermined displacement speed, and a predetermined rotational speed when a stable rock chip bed is formed in a simulated wellbore, or a first displacement, a predetermined displacement speed, and a predetermined rotational speed when a rock chip bed is not formed in the simulated wellbore.

11. The method of claim 9, wherein the obtaining monitoring data of drilling simulation and motor power of an electric motor corresponding to the set of working condition data includes:
adjusting, based on an eccentricity adjustment device, an eccentricity of a drill pipe to a predetermined eccentricity;
adjusting, based on a wellbore lifting device, the well inclination angle of the simulated wellbore to a predetermined well inclination angle;
inputting, based on a circulation pump, drilling fluid with the first displacement into the simulated wellbore through an inlet pipe, the first displacement being set based on a first frequency inverter;
collecting, based on a flow meter, a volume of the drilling fluid input into the simulated wellbore;
driving, based on the electric motor, the drill pipe to rotate at a predetermined rotational speed, the predetermined rotational speed being set by a third frequency inverter;
reading, based on the third frequency inverter, the motor power of the electric motor;
injecting, based on a feed control valve, rock chips into the simulated wellbore at the predetermined displacement speed through the inlet pipe, the predetermined displacement speed being set based on a second frequency inverter;
collecting, based on at least one camera and at least one ultrasonic probe, monitoring data of a rock chip bed in the simulated wellbore;
collecting, based on at least one manometer, pressure data of at least one part of the simulated wellbore;
determining the ECD based on the pressure data; and
determining the motor torque of the electric motor based on the motor power.

12. The method of claim 9, wherein the at least one manometer includes a plurality of manometers, and
the method further comprises:
determining a preferred test case based on the ECD correction parameters, the preferred test case including preferred working condition data and a manometric spacing distribution, and the manometric spacing distribution including spacing data between the plurality of manometers.

13. The method of claim 12, wherein the manometric spacing distribution of the preferred test case is determined based on a spacing distribution set corresponding to the preferred test case, wherein
the spacing distribution set includes at least one preferred spacing distribution; and
the determining the spacing distribution set corresponding to the preferred test case includes:
generating a plurality of candidate spacing distributions;
determining, for one of the plurality of candidate spacing distributions, a pressure difference sequence corresponding to the candidate spacing distribution under the preferred working condition data;
determining the candidate spacing distribution of which the pressure difference sequence satisfies a predetermined difference condition as the preferred spacing distribution; and
determining, based on the preferred spacing distribution, the spacing distribution set corresponding to the preferred test case.

14. The method of claim 12, wherein the determining a preferred test case based on the ECD correction parameters includes:
predicting, based on the plurality of sets of working condition data, the manometric spacing distribution corresponding to each of the plurality of sets of working condition data, the ECD correction parameters, and a candidate test case set, predicted correction parameters corresponding to each candidate test case of the candidate test case set through a coefficient prediction model, the coefficient prediction model being a machine learning model; and
determining the candidate test case corresponding to the predicted correction parameters satisfying a predetermined numerical condition as the preferred test case.

15. A non-transitory computer-readable storage medium, comprising computer instructions that, when read by a computer, direct the computer to perform the impact simulation method for the characteristics of the rock chip bed in the large displacement well of claim 9.

* * * * *